US010564912B2

(12) United States Patent
Yildiz et al.

(10) Patent No.: US 10,564,912 B2
(45) Date of Patent: Feb. 18, 2020

(54) SYSTEM AND METHOD OF MULTIPLE DISPLAY CONTROL

(71) Applicant: Dell Products L.P., Round Rock, TX (US)

(72) Inventors: Yagiz Can Yildiz, Austin, TX (US); Jace William Files, Round Rock, TX (US); Lawrence Stone, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 174 days.

(21) Appl. No.: 15/588,252

(22) Filed: May 5, 2017

(65) Prior Publication Data
US 2018/0321891 A1 Nov. 8, 2018

(51) Int. Cl.
*G06F 3/14* (2006.01)

(52) U.S. Cl.
CPC .......... *G06F 3/1423* (2013.01); *G06F 3/1454* (2013.01)

(58) Field of Classification Search
CPC ....... G06F 3/1423; G06F 3/1454; G09G 5/00; G09G 2320/0686; G09G 2320/0673; G09G 2320/066; G09G 2320/0626; G09G 2320/0606
See application file for complete search history.

(56) References Cited

U.S. PATENT DOCUMENTS

| | | | | |
|---|---|---|---|---|
| 2004/0036697 A1* | 2/2004 | Kim | ..................... | G06F 3/1431 345/617 |
| 2011/0004839 A1* | 1/2011 | Cha | ....................... | G06F 9/451 715/765 |
| 2012/0013635 A1* | 1/2012 | Beeman | ............... | G09G 3/2003 345/590 |
| 2012/0236045 A1* | 9/2012 | Tamura | ................ | G06F 3/1423 345/690 |
| 2015/0109460 A1* | 4/2015 | Yonishi | .................. | H04N 17/02 348/182 |

OTHER PUBLICATIONS

PangoBright https://web.archive.org/web/20101017210754/http://www.pangobright.com:80/ (Year: 2010).*
(Continued)

*Primary Examiner* — Chad M Dicke
(74) *Attorney, Agent, or Firm* — Baker Botts L.L.P.

(57) ABSTRACT

In one or more embodiments, one or more systems, methods, and/or processes described herein may display a graphical user interface via a display of multiple displays and receive first user input, via the graphical user interface, from a user that indicates altering an attribute of a first display and a second display of the multiple displays. First configuration data, based on the attribute, may be provided to a first control unit of the first display, which may adjust the first display accordingly, and second configuration data, based on the first configuration data and based on characteristic information of the second display, may be provided to a second control unit of the second display, which may adjust the second display accordingly. In one or more embodiments, adjustments to the first display and the second display may appear simultaneous to the user.

20 Claims, 6 Drawing Sheets

(56) References Cited

OTHER PUBLICATIONS

F1shard https://www.youtube.com/watch?v=GBsyUjcSaTE (Year: 2012).*
Computerwurld; https://www.youtube.com/watch?v=ar6xvWF3Od4 Aug, 2012.*
Dyndor; https://www.youtube.com/watch?v=UsFLDOzHKNE 2016.*
"Design Guidelines for DisplayPort and HDMI Interfaces," Altera Corporation, 20 pgs, Nov. 2, 2015.
Yip, Ada, "DisplayPort AUX Channel Application," Pericom Semiconductor Corp., Rev. 1.0, 4 pgs, Nov. 13, 2008.
"DisplayPort Update and Overview," Genesis Display Perfection, 31 pgs, Oct. 15, 2007.
Wiley, Craig, "DisplayPort Technical Overview," IEEE International Conference on Consumer Electronics, Advances & Challenges in HD Interconnects, 40 pgs, Jan. 10, 2011.

\* cited by examiner

SYSTEM AND METHOD OF MULTIPLE DISPLAY CONTROL

BACKGROUND

Field of the Disclosure

This disclosure relates generally to information handling systems and more particularly to controlling multiple displays.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Moreover, many users are using multiple monitors. Increasing the number of monitors, users adjust the settings on each monitor to have a consistent experience.

SUMMARY

In one or more embodiments, one or more systems, methods, and/or processes described herein may display a graphical user interface via a display of multiple displays and receive first user input, via the graphical user interface, from a user that indicates altering an attribute of a first display and a second display of the multiple displays. The attribute may be determined from the user input. For example, the attribute may include a brightness level, a contrast level, an output level of a backlight, a red level, a green level, a blue level, a cyan level, a magenta level, a cyan level, a key of black level, a sharpness level, a gamma level, a resolution, or a refresh rate, among others. First configuration data, based on the attribute, may be provided to a first control unit of the first display, and second configuration data, based on the first configuration data and based on characteristic information of the second display, may be provided to a second control unit of the second display. For example, a modification of the first configuration data, for utilization by the second display, based on the characteristic information of the second display, may be based on a relative change of a level. The first control unit may adjust the first display based on the first configuration data, and the second control unit may adjust the second display based on the second configuration data. In one or more embodiments, the first control unit adjusting the first display based on the first configuration data and the second control unit adjusting the second display based on the second configuration data appear simultaneous to the user.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
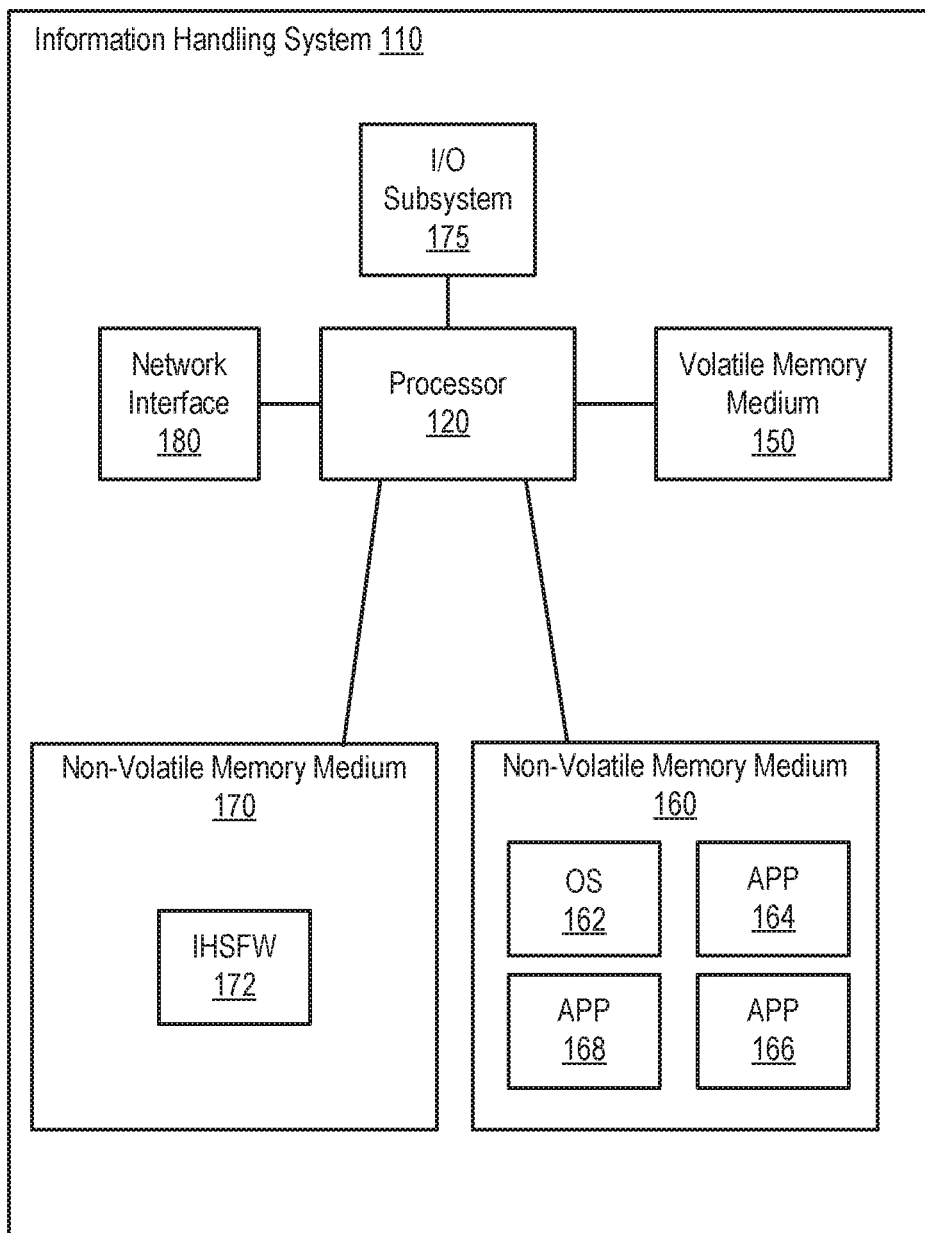
FIG. 1 illustrates an exemplary information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, a user may control one or more settings on multiple monitors via making adjustments on one monitor. For example, the user may control brightness, color settings, gamut, contrast, etc. on all displays using one interface. In one or more embodiments, a backchannel communication across the multiple displays may be utilized. For example, events may be provided from one or more of a display and an information handling system to one or more other displays via the backchannel communication. For instance, a control unit (e.g., a scalar) in each display may receive a display adjustment command and adjust the display in accordance with the command.

In one or more embodiments, relative adjustments may be performed. For example, an adjustment, such as brightness, may be a relative adjustment to a baseline setting. For instance, adjusting a brightness of a first display may cause a relative adjustment of a brightness on a second display, different from the first display, while maintaining any brightness difference between the first display and the second display.

In one or more embodiments, a graphical user interface may be utilized in performing adjustments on multiple displays. In one example, each display of the multiple displays may be selectable. For instance, respective settings of the multiple displays may be available for individual adjustment. In another example, a synchronous option may permit settings of the multiple displays to be adjusted simultaneously. In one or more embodiments, simultaneously adjusting the multiple displays may include adjusting the multiple displays in a fashion where any adjustment applied to the multiple displays appears to be simultaneous to a user. In one example, adjusting the multiple displays may be performed in serial fashion, where any adjustment applied to the multiple displays, in a serial fashion, appears to be simultaneous to a user. In a second example, adjusting the multiple displays may be performed in parallel fashion, where any adjustment applied to the multiple displays, in a parallel fashion, appears to be simultaneous to a user. In another example, adjusting the multiple displays may be performed in parallel and serial fashion, where any adjustment applied to the multiple displays, in a parallel and serial fashion, appears to be simultaneous to a user.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
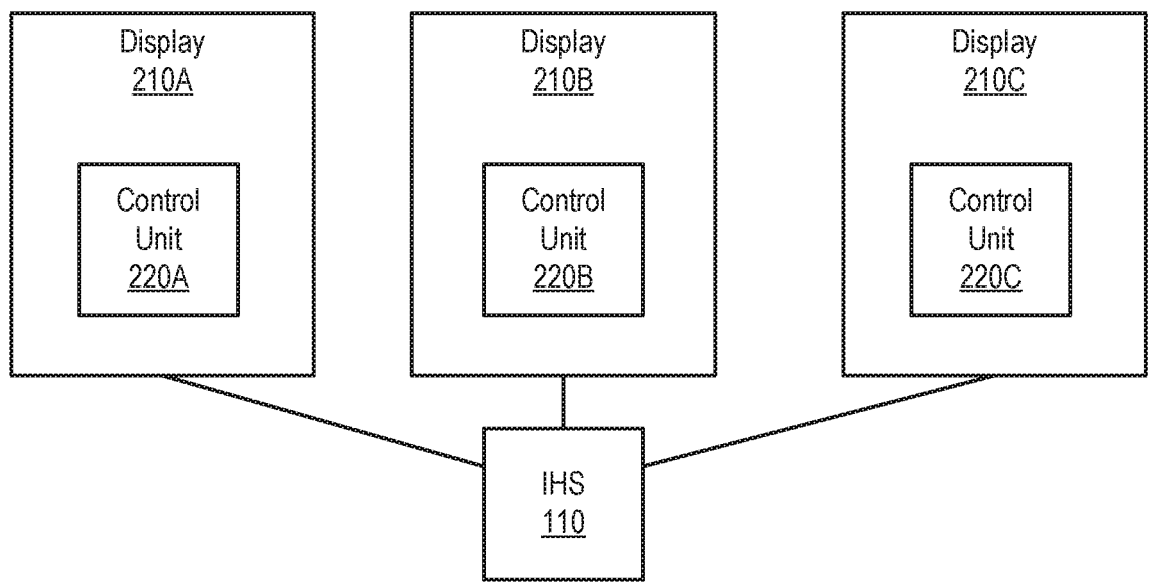
FIGS. 2A and 2B illustrate displays coupled to an information handling system, according to one or more embodiments.
Figure 2B:
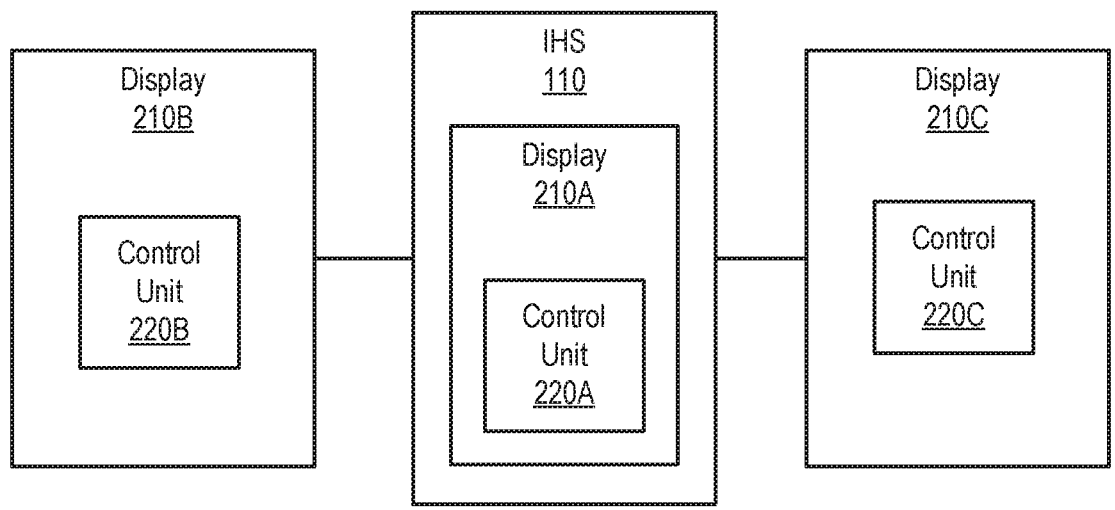

Turning now to FIGS. 2A and 2B, displays coupled to an information handling system are illustrated, according to one or more embodiments. As shown in FIG. 2A, displays 210A-210C may be coupled to IHS 110. As illustrated in FIG. 2B, IHS 110 may include display 210A. As shown, displays 210A-210C may include respective control units 220A-220C. For example, control units 220A-220C may include respective scalars. In one or more embodiments, control unit 220 may control one or more attributes of display 220. For example, the one or more attributes may include one or more of a brightness level, a contrast level, an output level of a backlight, a red level, a green level, a blue level, a cyan level, a magenta level, a cyan level, a key of black level, a sharpness level, a gamma level, a resolution, and a refresh rate, among others.

In one or more embodiments, one or more of displays 210A-210C and IHS 110 may be communicatively coupled to one another in a wired fashion. For example, one or more of displays 210A-210C and IHS 110 may be communicatively coupled to one another via one or more of VGA (video graphics array), DVI (digital video interface), HDMI (high-definition multimedia interface), DisplayPort, Thunderbolt, LVDS (low-voltage differential signaling), PCIe, Ethernet, displayport AUX channel, a USB, a consumer electronics control (CEC) bus, an $I^2C$ bus, and a SPI bus, among others. In one or more embodiments, one or more of displays 210A-210C and IHS 110 may be communicatively coupled to one another in a wireless fashion. For example, one or more of displays 210A-210C and IHS 110 may be communicatively coupled to one another via one or more WiFi, Wireless Ethernet, Bluetooth, IEEE (Institute of Electrical and Electronics Engineers) 802.15, and ZigBee, among others.

Figure 3:
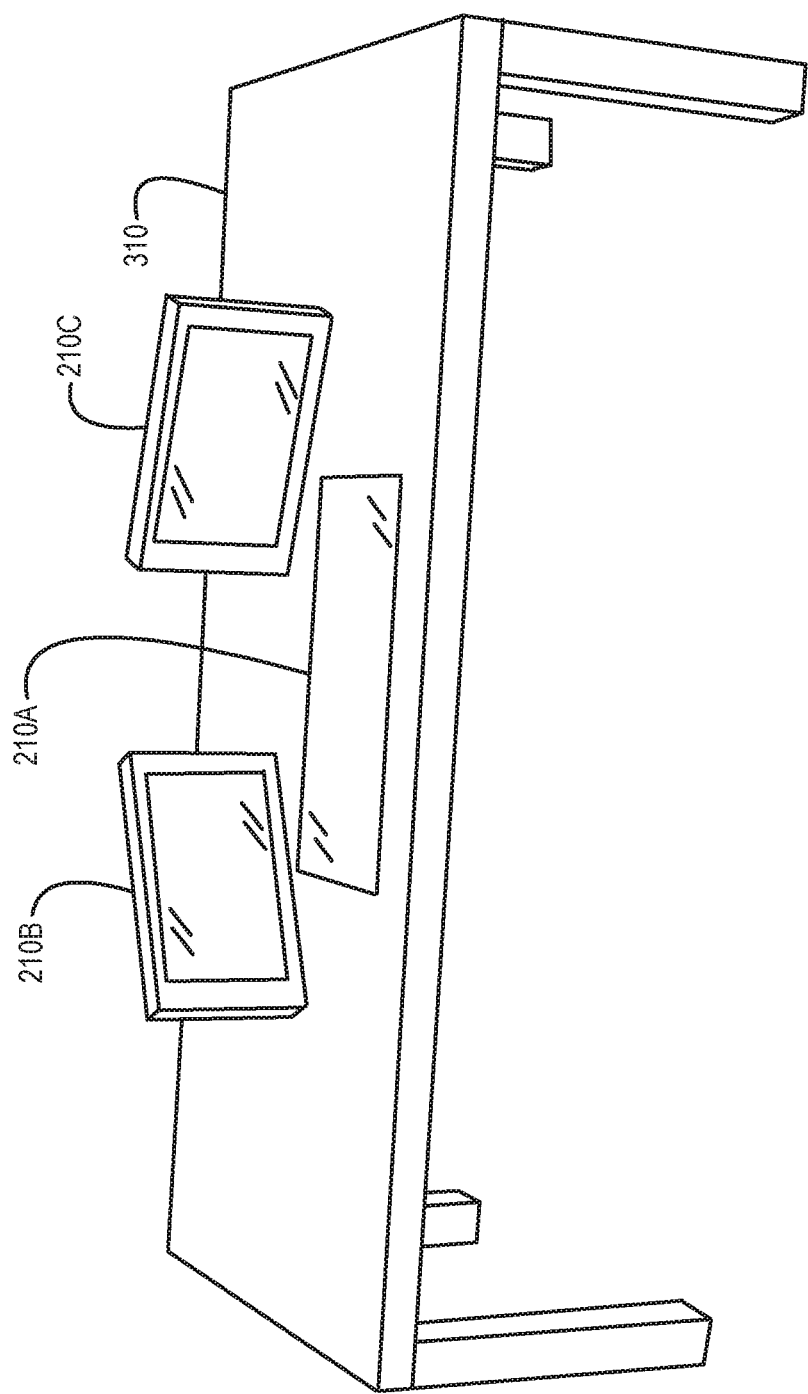
FIG. 3 illustrates a configuration of displays, according to one or more embodiments.

Turning now to FIG. 3, a configuration of displays is illustrated, according to one or more embodiments. As shown, displays 210A-210C may lay on a surface 310. In one example, surface 310 may be or include a surface of a table. In another example, surface 310 may be or include a surface of a desk. In one or more embodiments, display 210A may be integrated into surface 310. In one or more embodiments, display 210 may be or include a touch screen. In one example, display 210 may be or include a resistive touch screen. In another example, display 210 may be or include a capacitive touch screen. In one or more embodiments, a stylus may be utilized with display 210.

Figure 4:
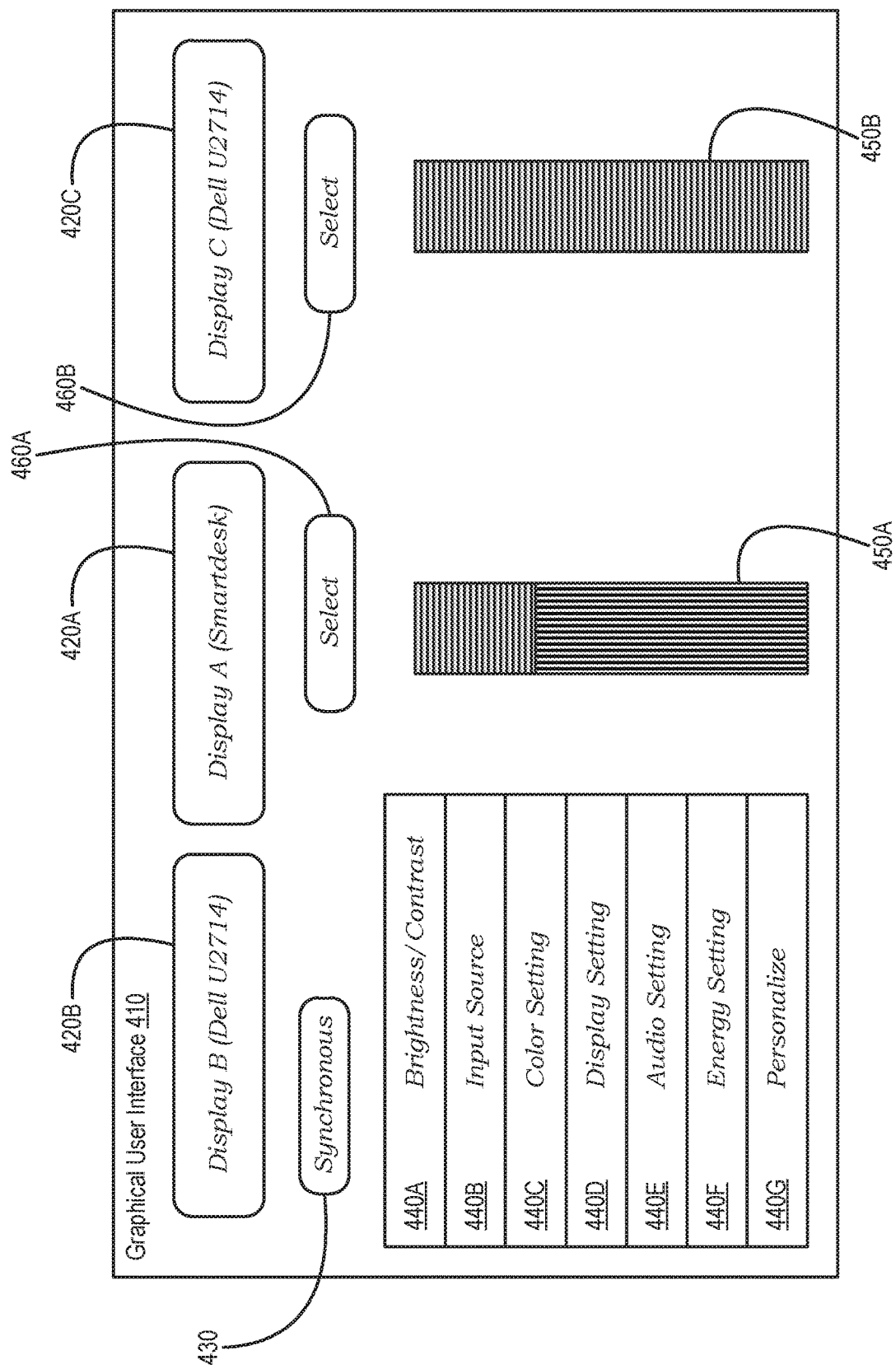
FIG. 4 illustrates a graphical user interface, according to one or more embodiments.

Turning now to FIG. 4, a graphical user interface is illustrated, according to one or more embodiments. As shown, a graphical user interface (GUI) 410 may include one or more selectable icons and level adjustors. For example, a display of displays 210A-210C may display GUI 410. For instance, one or more of IHS 110 and displays 210A-210C may be utilized in receiving user input via GUI 410.

In one or more embodiments, GUI 410 may display one or more current configurations of one or more of displays 210A-210C. For example, IHS 110 may query one or more of displays 210A-210C for respective one or more configurations, one or more of displays 210A-210C may provide the respective one or more configurations, and IHS 110 may receive the respective one or more configurations. For instance, an application (APP) of APPs 164-168 may utilize and/or include GUI 410 and may display, via GUI 410, the respective one or more current configurations of one or more of displays 210A-210C received from one or more of displays 210A-210C.

As illustrated, GUI 410 may include selectable icons 420A-420C. For example, a selectable icon of selectable icons 420A-420C may be utilized to control a respective display of displays 210A-210C. In one or more embodiments, two or more displays may be simultaneously controlled. For example, two of more of selectable icons 420A-420C may be utilized to control two respective displays of displays 210A-210C. As shown, GUI 410 may include, a selectable icon 430. In one or more embodiments, selectable icon 430 may be utilized to control all displays 210A-210C, simultaneously. For example, selectable icon 430 may be utilized to control all of displays 210A-210C, simultaneously.

As shown, GUI 410 may include selectable icons 440A-440G. In one or more embodiments, selectable icons 440A-440G may be utilized in controlling and/or setting one or more attributes of one or more of displays 210A-210C. As illustrated, GUI 410 may include level adjustors 450A and 450B. In one or more embodiments, one or more of level adjustors 450A and 450B may be utilized in adjusting one or more levels. In one example, level adjustor 450A may be utilized in adjusting a brightness level. In another example, level adjustor 450B may be utilized in adjusting a contrast level. As shown, GUI 410 may include selectable icons 460A and 460B. In one or more embodiments, one or more selectable icons 460A and 460B may be utilized in selecting one or more levels indicated by one or more of level adjustors 450A and 450B. In one example, selectable icon 460A may be selected to select and/or set a level from level adjustor 450A. In another example, selectable icon 460B may be selected to select and/or set a level from level adjustor 450B.

In one or more embodiments, one or more of IHS 110 and displays 210A-210C may be utilized in determining an attribute indicated via the user input. For example, the attribute may include a brightness, a contrast, an output level of a backlight, a red level, a green level, a blue level, a cyan level, a magenta level, a cyan level, a key of black level, a sharpness level, a gamma level, a resolution, or a refresh rate, among others. In one or more embodiments, the attribute may include a level. For example, the level may include an amount.

In one or more embodiments, configuration data may be determined based on the attribute. In one example, configuration data may be determined for two or more displays. For instance, the configuration data may be applicable to the two or more displays. In another example, configuration data may be determined for each of the two or more displays. For instance, first configuration data may be determined for a first display of the two or more displays, and second configuration data, different from the first configuration data, may be determined for a second display of the two or more displays. In one or more embodiments, one or more of IHS 110 and displays 210A-210C may determine the configuration data, based on the attribute, for the two or more displays.

In one or more embodiments, the configuration data may be provided to one or more of displays 210A-210C. In one example, IHS 110 may provide the configuration data to one or more of displays 210A-210C. For instance, IHS 110 may utilize a device driver to provide the configuration data to one or more of displays 210A-210C. In another example, a display of displays 210A-120C may provide the configuration data to one or more other displays of displays 210A-210C. In one or more embodiments, one or more of IHS 110 and displays 210A-210C may modify the configuration data, based on the attribute, for one or more of the two or more displays. In one example, the configuration data may be modified before the configuration data is provided to one or more of displays 210A-210C. In another example, the first display may be different from the second display. For instance, a level of the attribute may be applicable for the first display and may be scaled and/or translated for the second display. In one or more embodiments, same configuration data may be provided to the two or more displays, and a display of the two or more displays may modify the configuration data.

In one or more embodiments, when a display performs an operation and/or task, a control unit of the display may be utilized in performing the operation and/or the task. In one example, control unit 220 may be utilized in determining the configuration data, based on the attribute, for the two or more displays. In another example, control unit 220 may be utilized in modifying the configuration data, based on the attribute, for one or more of the two or more displays. For instance, control unit 220 may be utilized in receiving the configuration data and may be utilized in modifying the configuration data, based on the attribute, for display 210, after the configuration data is received. In one or more embodiments, control unit 220 may be utilized in adjusting display 210 based on a modification from modifying the configuration information.

In one or more embodiments, multiple configurations may be determined based on the attribute. In one example, each configuration of the multiple configurations is another configuration of the multiple configurations. In a second example, at least one configuration is different from another of the multiple configurations. In another example, at least one configuration is different from at least two configurations of the multiple configurations.

In one or more embodiments, configuration data may be determined from and/or be based on a configuration. For example, first configuration data may be may be determined from and/or be based on a first configuration, second configuration data may be may be determined from and/or be based on a second configuration, and third configuration data may be may be determined from and/or be based on a third configuration. In one instance, the first configuration data may be different from the second configuration data when the first configuration is different from the second configuration. In a second instance, the first configuration data may be the second configuration data when the first configuration is the second configuration. In another instance, third configuration data may be different from at least the first configuration data and the second configuration data when the third configuration is different from at least the first configuration and the second configuration.

In one or more embodiments, multiple displays may be similar or same, and two or more displays of the multiple displays may utilize different configuration data based on two or more respective modes of the two or more displays. For example, a first display of the two or more displays may utilize a CMYK (cyan, magenta, yellow and key) mode and a second display of the two or more displays may utilize a RGB (red, green, and blue) mode. For instance, the first display may utilize first configuration data, and the second display may utilize second configuration data, different from the first configuration data. In one or more embodiments, configuration data may not alter a calibration of a display. For example, configuration data that alters a brightness of the display may alter a backlight of the display. For instance, the configuration data that alters the brightness of the display may not alter one or more of red, green, and blue configurations and/or calibrations of the display.

Figure 5:
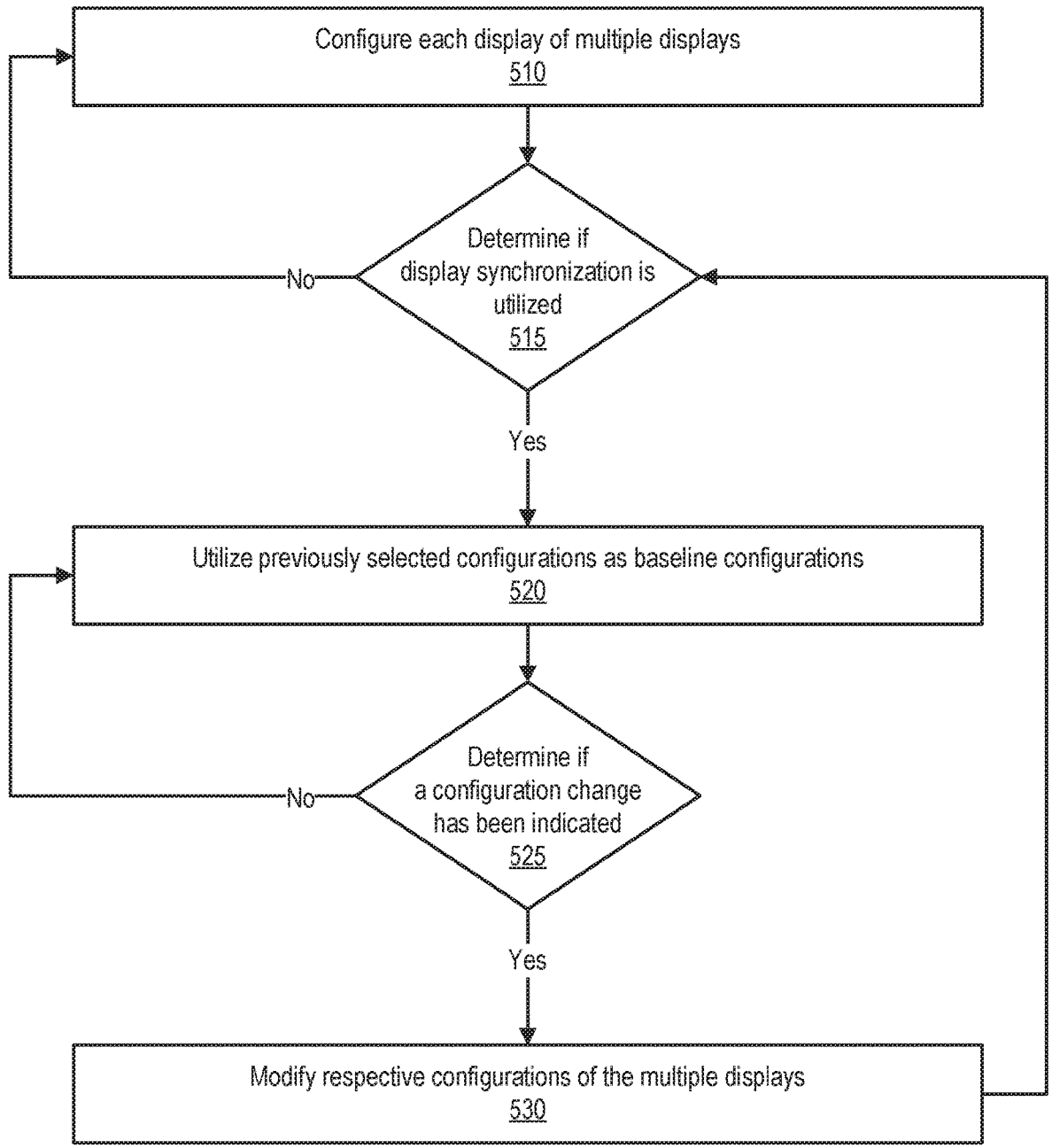
FIG. 5 illustrates a method of operating one or more displays, according to one or more embodiments.

Turning now to FIG. 5, a method of operating one or more displays is illustrated, according to one or more embodiments. At 510, each display of multiple displays may be configured. For example, a user may separately configure each of displays 210A-210C. At 515, it may be determined if display synchronization is utilized. For example, determining if display synchronization is utilized may include determining if selectable icon 430 has been selected. If display synchronization is not utilized, the method may proceed to 510. If display synchronization is utilized, previously selected configurations may be utilized as baseline configurations at 520.

In one or more embodiments, utilizing one or more previously selected configurations as one or more baseline configurations may include querying one or more displays and receiving respective one or more configurations from the one or more displays. For example, IHS 110 may query one or more of displays 210A-210C for respective one or more configurations, one or more of displays 210A-210C may provide the respective one or more configurations, and IHS 110 may receive the respective one or more configurations.

At 525, it may be determined if a configuration change has been indicated. For example, a configuration change may be indicated via user input. For instance, the configuration change may be indicated via GUI 410. If a configuration change has not been indicated, the method may proceed to 520. If a configuration change has been indicated, respective configurations of the multiple displays may be modified at 530. For example, respective configurations of displays 210A-210C may be modified. In one or more embodiments, the method may proceed to 510.

In one or more embodiments, modifying respective configurations of the multiple displays may include modifying respective baseline configurations of the multiple displays. In one example, a configuration of display 210B may include a brightness level of thirty percent (30%), and a configuration of display 210C may include a brightness level of sixty percent (60%). In one instance, the brightness may be increased by ten percent (10%), where the configuration of display 210B may be altered, increasing the brightness level to forty (40%), and where the configuration of display 210C may be altered, increasing the brightness level to eighty (80%) percent (e.g., a relative level change of a one-third (⅓) increase in the brightness level of display 210C). In another instance, the brightness may be increased by fifteen percent (15%), where the configuration of display 210B may be altered, increasing the brightness level to forty-five (45%), and where the where the configuration of display 210C may be altered, increasing the brightness level to seventy-five (75%) (e.g., an absolute increase in the brightness level of display 210C). In one or more embodiments, other attributes may be altered in a same or a similar fashion.

In one or more embodiments, a configuration based on an attribute may be modified based on characteristic configuration information of a display. In one example, the characteristic configuration information may include a baseline configuration of the display. In one instance, a baseline configuration of display 210B may include a brightness level of thirty percent (30%). In another instance, a baseline configuration of display 210C may include a brightness level of sixty percent (60%). In another example, the characteristic configuration information may include information associated with hardware and/or firmware of the display. For instance, configuration data may be modified based on information associated with hardware and/or firmware of the display.

Figure 6:
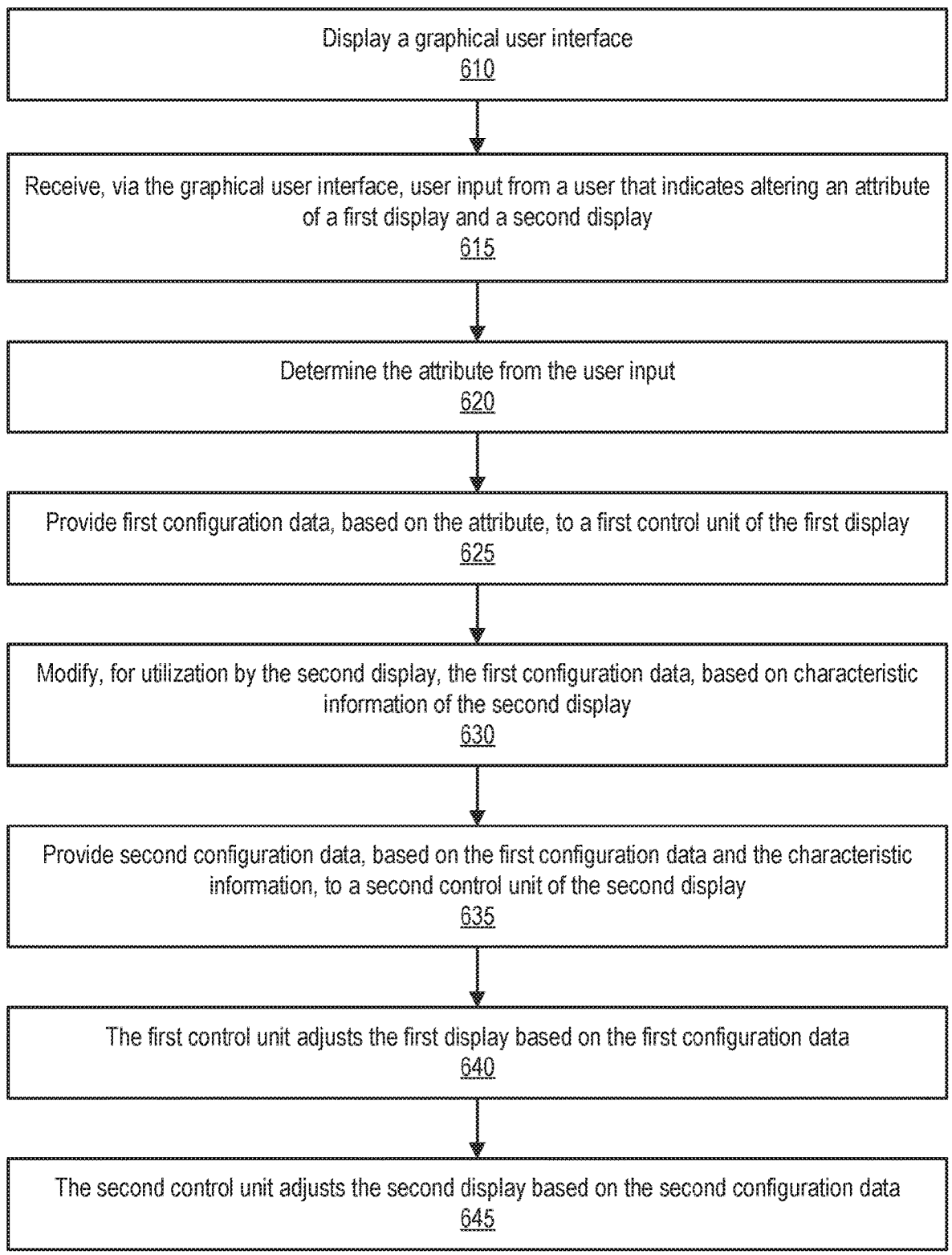
FIG. 6 illustrates another method of operating one or more displays, according to one or more embodiments.

Turning now to FIG. 6, another method of operating one or more displays is illustrated, according to one or more embodiments. At 610, a graphical user interface may be displayed. For example, GUI 410 may be displayed. For instance, display 210 may display GUI 410. In one or more embodiments, an application of APPs 164-168 may include GUI 410. For example, IHS 110 may provide and/or display GUI 410 via display 210. At 615, user input may be received, via the graphical user interface, from a user that indicates altering an attribute of a first display and a second display of multiple displays. For example, user input may be received, via GUI 410, that indicates altering an attribute of a first display and a second display of displays 210A-210C. In one instance, receiving the user input may include receiving the user input via a touch screen that displays GUI 410. In another instance, receiving the user input may include receiving the user input via a pointing device (e.g., a mouse, a trackball, a trackpad, etc.).

At 620, the attribute may be determined. For example, an attributed of a brightness, a contrast, an output level of a backlight, a red level, a green level, a blue level, a cyan level, a magenta level, a cyan level, a key of black level, a sharpness level, a gamma level, a resolution, or a refresh rate, among others, may be determined. At 625, first configuration data, based on the attribute, may be provided to a first control unit of the first display. For example, first configuration data, based on the attribute, may be provided to control unit 220A of display 210A.

In one or more embodiments, providing configuration data to a display may include providing the configuration data to the display via one or more of a displayport AUX channel, a USB, a CEC bus, an I²C bus, one or more WiFi signals, and one or more Ethernet signals, among others. For example, providing configuration data to the display may include providing the configuration data to a control unit of the display via one or more of a displayport AUX channel, a USB, a CEC bus, an I²C bus, one or more WiFi signals, and one or more Ethernet signals, among others.

At 630, the first configuration data may be modified, for utilization by the second display, based on characteristic information of the second display. In one or more embodiments, the first configuration data may be modified based on characteristic configuration information of the second display. In one example, the characteristic configuration information may include a baseline configuration of the second display. For instance, the characteristic configuration information may include a baseline configuration of display 210B. In another example, the characteristic configuration information may include information associated with hardware and/or firmware of the second display. For instance, the characteristic configuration information may include information associated with hardware and/or firmware of display 210B.

In one or more embodiments, IHS 110 may modify the first configuration data for utilization by the second display. For example, IHS 110 may modify the first configuration data for utilization by display 210B. In one or more embodiments, the first display may modify the first configuration data for utilization by the second display. For example, display 210A may modify the first configuration data for utilization by display 210B. In one or more embodiments, the second configuration data may be produced from the first configuration data by modifying the first configuration data with the characteristic information of the second display. For example, the second configuration data may be produced from the first configuration data by modifying the first configuration data with the characteristic information of display 210B.

At 635, second configuration data, based on the first configuration data and based on the characteristic information of the second display, may be provided to a second control unit of the second display. For example, second configuration data, based on the first configuration data and based on the characteristic information of the second display, may be provided to control unit 220B of display 210B. At 640, the first control unit may adjust the first display based on the first configuration data. For example, control unit 220A may adjust display 210A based on the first configuration data. At 645, the second control unit may adjust the second display based on the second configuration data. For example, control unit 220B may adjust display 210B based on the second configuration data.

In one or more embodiments, two or more of method elements 625-645 may be performed in a fashion that appears to be simultaneous to a user. In one example, two or more of method elements 625-645 may be performed in a serial fashion that appears to be simultaneous to the user. In a second example, two or more of method elements 625-645 may be performed in a parallel fashion that appears to be simultaneous to the user. In another example, two or more of method elements 625-645 may be performed in a combination of a parallel fashion and a serial fashion that appears to be simultaneous to the user.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
an information handling system that includes a processor and a memory medium, coupled to the processor, that stores instructions executable by the processor; and
a plurality of displays coupled to the information handling system;
wherein as the processor executes the instructions, the information handling system:
displays a graphical user interface via a display of the plurality of displays;
receives first user input, via the graphical user interface, from a user that indicates altering a first attribute of a first display and a second display of the plurality of displays, wherein the first attribute includes a contrast level, a color level, a key of black level, a sharpness level, a gamma level, or a refresh rate;
determines, from the first user input, the first attribute;
provides first configuration data, based on the first attribute, to a first control unit of the first display;
queries the second display for a configuration associated with the second display;
receives, from the second display, the configuration associated with the second display, wherein the configuration associated with the second display includes at least one of a contrast level associated with the second display, a color level associated with the second display, a key of black level associated with the second display, a sharpness level associated with the second display, a gamma level associated with the second display, and a refresh rate associated with the second display;
provides second configuration data, based on the first configuration data, based on the configuration associated with the second display, and based on characteristic information of the second display, to a second control unit of the second display, wherein the characteristic information of the second display includes at least one of a baseline configuration of the second display, information associated with hardware of the second display, and information associated with firmware of the second display;
wherein the first control unit adjusts the first display based on the first configuration data;
wherein the second control unit adjusts the second display based on the second configuration data;
wherein the first control unit adjusts the first display based on the first configuration data and the second control unit adjusts the second display based on the second configuration data appear simultaneous to the user;
wherein the information handling system further:
receives second user input, via the graphical user interface, from the user that indicates altering a second attribute of the first display, wherein the second attribute includes the contrast level, the color level, the key of black level, the sharpness level, the gamma level, or the refresh rate;

determines, from the second user input, the second attribute; and provides third configuration data, based on the second attribute, to the first control unit of the first display; and wherein the first control unit adjusts the first display based on the third configuration data.

2. The system of claim 1, wherein the information handling system further modifies the first configuration data, for utilization by the second display, based on the characteristic information of the second display.

3. The system of claim 2,
wherein the first attribute includes a level; and
wherein when the information handling system modifies the first configuration data, for utilization by the second display, based on the characteristic information of the second display, the information handling system modifies the first configuration data, for utilization by the second display, based on a relative change of the level, wherein the relative change of the level is based on the configuration of the second display.

4. The system of claim 2,
wherein the first attribute includes a level; and
wherein when the information handling system modifies the first configuration data, for utilization by the second display, based on the characteristic information of the second display, the information handling system modifies the first configuration data, for utilization by the second display, based on an absolute change of the level.

5. The system of claim 1,
wherein the color level includes a red level, a green level, a blue level, a cyan level, or a magenta level;
wherein the first attribute further includes a brightness level an output level of a backlight; and
wherein the second attribute further includes the brightness level, the output level of the backlight, or the resolution.

6. The system of claim 1,
wherein the information handling system further provides fourth configuration data, based on the first attribute, to a third control unit of a third display of the plurality of displays; and
wherein the third control unit adjusts the third display based on the fourth configuration data.

7. The system of claim 6, wherein the fourth configuration data is different from at least one of the first configuration data, the second configuration data, and the third configuration.

8. The system of claim 1, wherein when the information handling system provides the second configuration data, based on the first attribute and based on the characteristic information of the second display, to the second control unit of the second display, the information handling system provides the second configuration data, based on the first attribute and based on the characteristic information of the second display, to the second control unit of the second display via at least one of a displayport AUX channel, a universal serial bus (USB), a consumer electronics control (CEC) bus, an inter-integrated circuit (I²C) bus, one or more WiFi signals, and one or more Ethernet signals.

9. The system of claim 1,
wherein the display of the plurality of displays is the first display; and
wherein the information handling system includes the display of the plurality of displays.

10. A method, comprising:
displaying a graphical user interface;
receiving first user input, via the graphical user interface, from a user that indicates altering a first attribute of a first display and a second display of a plurality of displays, wherein the first attribute includes a contrast level, a color level, a key of black level, a sharpness level, a gamma level, or a refresh rate;
determining, from the first user input, the first attribute;
providing first configuration data, based on the first attribute, to a first control unit of the first display;
querying the second display for a configuration associated with the second display;
receiving, from the second display, the configuration associated with the second display, wherein the configuration associated with the second display includes at least one of a contrast level associated with the second display, a color level associated with the second display, a key of black level associated with the second display, a sharpness level associated with the second display, a gamma level associated with the second display, and a refresh rate associated with the second display;
providing second configuration data, based on the first configuration data, based on the configuration associated with the second display, and based on characteristic information of the second display, to a second control unit of the second display, wherein the characteristic information of the second display includes at least one of a baseline configuration of the second display, information associated with hardware of the second display, and information associated with firmware of the second display;
the first control unit adjusting the first display based on the first configuration data;
the second control unit adjusting the second display based on the second configuration data;
receiving second user input, via the graphical user interface, from the user that indicates altering a second attribute of the first display, wherein the second attribute includes the contrast level, the color level, the key of black level, the sharpness level, the gamma level, or the refresh rate;
determining, from the second user input, the second attribute;
providing third configuration data, based on the second attribute, to the first control unit of the first display; and
the first control unit adjusting the first display based on the third configuration data;
wherein the first control unit adjusting the first display based on the first configuration data and the second control unit adjusting the second display based on the second configuration data appear simultaneous to the user.

11. The method of claim 10, further comprising:
modifying the first configuration data, for utilization by the second display, based on the characteristic information of the second display.

12. The method of claim 11,
wherein the first attribute includes a level; and
wherein the modifying the first configuration data, for utilization by the second display, based on the characteristic information of the second display includes modifying the first configuration data, for utilization by the second display, based on a relative change of the level, wherein the relative change of the level is based on the configuration of the second display.

13. The method of claim 11,
wherein the first attribute includes a level; and
wherein the modifying the first configuration data, for utilization by the second display, based on the characteristic information of the second display includes modifying the first configuration data, for utilization by the second display, based on an absolute change of the level.

14. The method of claim 10,
wherein the color level includes a red level, a green level, a blue level, a cyan level, or a magenta level;
wherein the first attribute further includes a brightness level, an output level of a backlight or a resolution; and
wherein the second attribute further includes the brightness level, the output level of the backlight, or the resolution.

15. The method of claim 10, further comprising:
providing fourth configuration data, based on the first attribute, to a third control unit of a third display of the plurality of displays; and
the third control unit adjusting the third display based on the fourth configuration data.

16. The method of claim 15, wherein the fourth configuration data is different from at least one of the first configuration data, and the second configuration data, and the third configuration data.

17. The method of claim 10, wherein the providing the second configuration data, based on the first attribute and based on the characteristic information of the second display, to the second control unit of the second display includes providing the second configuration data, based on the first attribute and based on the characteristic information of the second display, to the second control unit of the second display via at least one of a displayport AUX channel, a universal serial bus (USB), a consumer electronics control (CEC) bus, an inter-integrated circuit ($I^2C$) bus, one or more WiFi signals, and one or more Ethernet signals.

18. The method of claim 10,
wherein an information handling system includes the first display; and
wherein the displaying the graphical user interface includes the first display displaying the graphical user interface.

19. The system of claim 1, wherein the second attribute is different from the first attribute.

20. The method of claim 10, further comprising:
the first display modifying the first configuration data, based on characteristic information of the second display for utilization by the second display to produce the second configuration data.

* * * * *